(12) United States Patent
Lam et al.

(10) Patent No.: US 9,882,271 B2
(45) Date of Patent: Jan. 30, 2018

(54) CONFORMAL ANTENNA AND RELATED METHODS OF MANUFACTURE

(71) Applicant: Lockheed Martin Corporation, Bethesda, MD (US)

(72) Inventors: Tommy Lam, Apalachin, NY (US); Nicholas Gretzinger, Vestal, NY (US); Christopher Jordan Torbitt, Binghamton, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 49 days.

(21) Appl. No.: 14/790,260

(22) Filed: Jul. 2, 2015

(65) Prior Publication Data

US 2017/0005403 A1    Jan. 5, 2017

(51) Int. Cl.

| | |
|---|---|
| *H01Q 1/28* | (2006.01) |
| *H01Q 1/38* | (2006.01) |
| *H01Q 9/06* | (2006.01) |
| *B22F 3/105* | (2006.01) |
| *B22F 7/08* | (2006.01) |

(Continued)

(52) U.S. Cl.
CPC ........... *H01Q 1/287* (2013.01); *B22F 3/1055* (2013.01); *B22F 7/08* (2013.01); *H01Q 1/286* (2013.01); *H01Q 1/50* (2013.01); *H01Q 9/065* (2013.01); *B33Y 10/00* (2014.12); *B33Y 80/00* (2014.12); *H01Q 1/38* (2013.01); *H01Q 9/0407* (2013.01)

(58) Field of Classification Search
CPC ........ B64C 1/36; B64C 23/065; H01Q 1/283; H01Q 1/287; H01Q 1/48; H01Q 1/42; H01Q 1/50; H01Q 1/286; H01Q 1/38; H01Q 9/0407; H01Q 9/065

USPC .......... 343/700 MS, 705, 708, 711, 713, 795
See application file for complete search history.

(56) References Cited

U.S. PATENT DOCUMENTS 5,309,164 A * 5/1994 Dienes ................ H01Q 21/065
                                                      343/700 MS
6,094,106 A * 7/2000 Kishino .................. H01P 3/165
                                                      333/113

(Continued)

FOREIGN PATENT DOCUMENTS

WO    WO 2014-015127 A1    1/2014

OTHER PUBLICATIONS

International Search Report and Written Opinion for Application No. PCT/US2015/041458 dated Mar. 7, 2016.

(Continued)

*Primary Examiner* — Tho G Phan
(74) *Attorney, Agent, or Firm* — Wolf, Greenfield & Sacks, P.C.

(57) ABSTRACT

According to some aspects, an antenna is provided comprising a substrate, a first conductive region disposed on a first side of the substrate, a second conductive region disposed on a second side of the substrate, and a coaxial transmission line, an inner conductor of the coaxial transmission line electrically coupled to the first conductive region and an outer conductor of the coaxial transmission line electrically coupled to the second conductive region, wherein the second conductive region includes at least one structural feature that functions as a choke when the first and second conductive regions are operated together as an antenna. According to some aspects, an aerial vehicle comprising a conformal antenna is provided.

28 Claims, 5 Drawing Sheets

(51) Int. Cl.
*H01Q 1/50* (2006.01)
*H01Q 9/04* (2006.01)
*B33Y 10/00* (2015.01)
*B33Y 80/00* (2015.01)

(56) References Cited

U.S. PATENT DOCUMENTS

| | | | |
|---|---|---|---|
| 7,307,586 B2* | 12/2007 | Peshlov | H01Q 21/0075 |
| | | | 343/700 MS |
| 9,318,806 B2* | 4/2016 | Yarga | H01Q 5/328 |
| 2004/0217912 A1 | 11/2004 | Mohammadian | |
| 2006/0158383 A1 | 7/2006 | Kwon et al. | |
| 2010/0181385 A1* | 7/2010 | Brod | G06K 19/07749 |
| | | | 235/492 |
| 2015/0340768 A1* | 11/2015 | Rucker | H01Q 21/00 |
| | | | 343/893 |

OTHER PUBLICATIONS

Munson, Conformal Microstrip Antennas. Microwave Journal 31. 1988; 31(3):9pages. XP002052278.

* cited by examiner

210

220

230

232

240

242  232

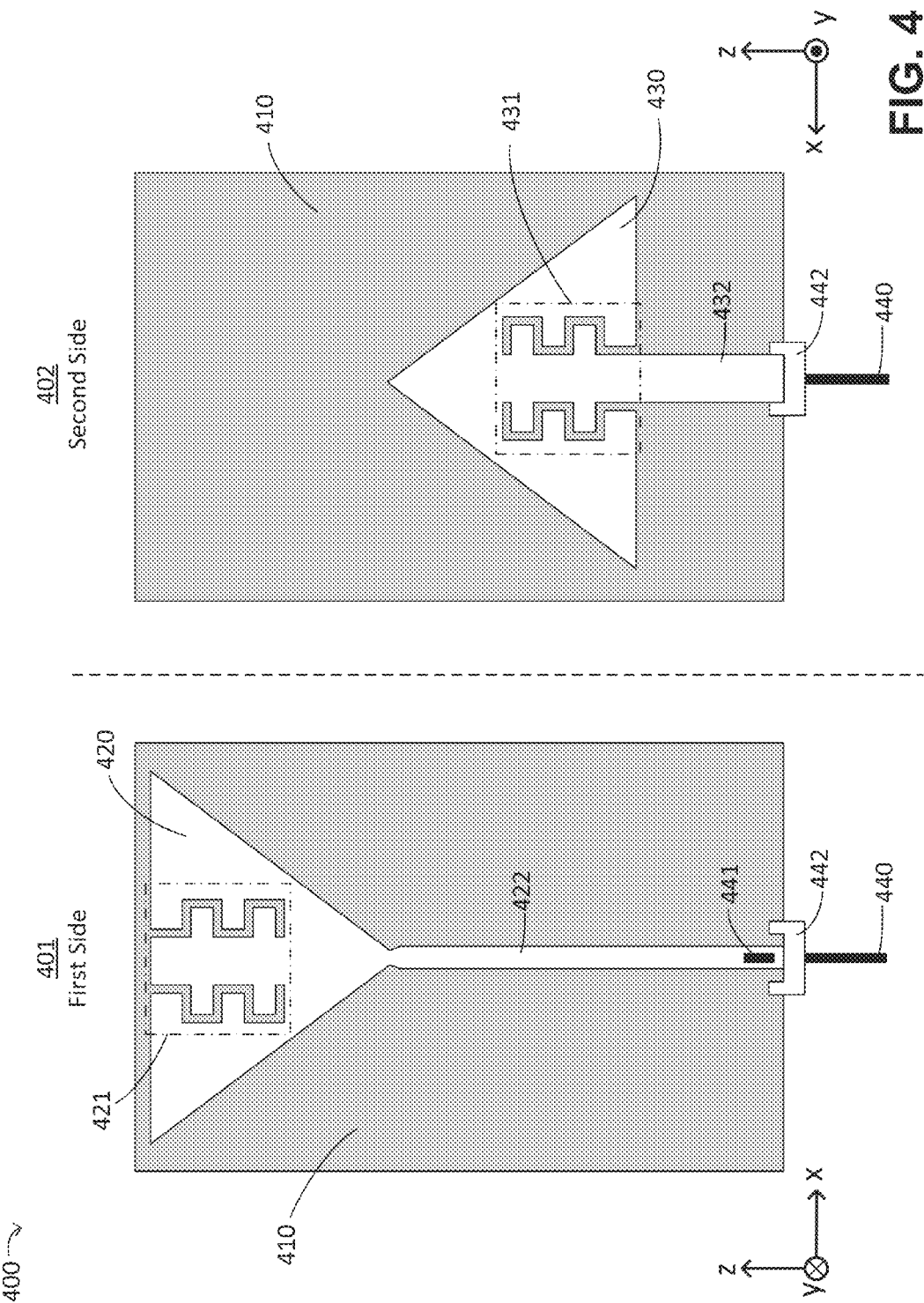

CONFORMAL ANTENNA AND RELATED METHODS OF MANUFACTURE

BACKGROUND

The majority of commercial communication antennas, which include broadcast tower antennas and antennas attached to ground or aerial vehicles, are vertically polarized. The vertical polarization may be produced by an antenna structure having at least a portion that is spatially aligned in a vertical direction.

SUMMARY

The present application relates generally to conformal antennas, and in particular to a conformal antenna produced via additive manufacturing.

According to some aspects, an antenna is provided comprising a substrate, a first conductive region disposed on a first side of the substrate, a second conductive region disposed on a second side of the substrate, and a coaxial transmission line, an inner conductor of the coaxial transmission line electrically coupled to the first conductive region and an outer conductor of the coaxial transmission line electrically coupled to the second conductive region, wherein the second conductive region includes at least one structural feature that functions as a choke when the first and second conductive regions are operated together as an antenna.

According to some aspects, a method of fabricating a conformal antenna is provided, the method comprising forming a substrate from a dielectric material via additive fabrication, forming, from a conductive material via additive fabrication, a first conductive region on a first side of the substrate, and forming, from the conductive material via additive fabrication, a second conductive region on a second side of the substrate, wherein the second conductive region includes at least one feature that functions as a choke when the first and second conductive regions are operated together as an antenna.

According to some aspects, an aerial vehicle is provided comprising at least one conformal antenna that comprises a substrate, a first conductive region disposed on a first side of the substrate, a second conductive region disposed on a second side of the substrate, and a coaxial transmission line, an inner conductor of the coaxial transmission line electrically coupled to the first conductive region and an outer conductor of the coaxial transmission line electrically coupled to the second conductive region, wherein the second conductive region includes at least one structural feature that functions as a choke when the first and second conductive regions are operated together as an antenna.

The foregoing is provided by way of illustration and is not intended to be limiting.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIG. 4 depicts an illustrative conformal antenna, according to some embodiments.

DETAILED DESCRIPTION

Figure 1:
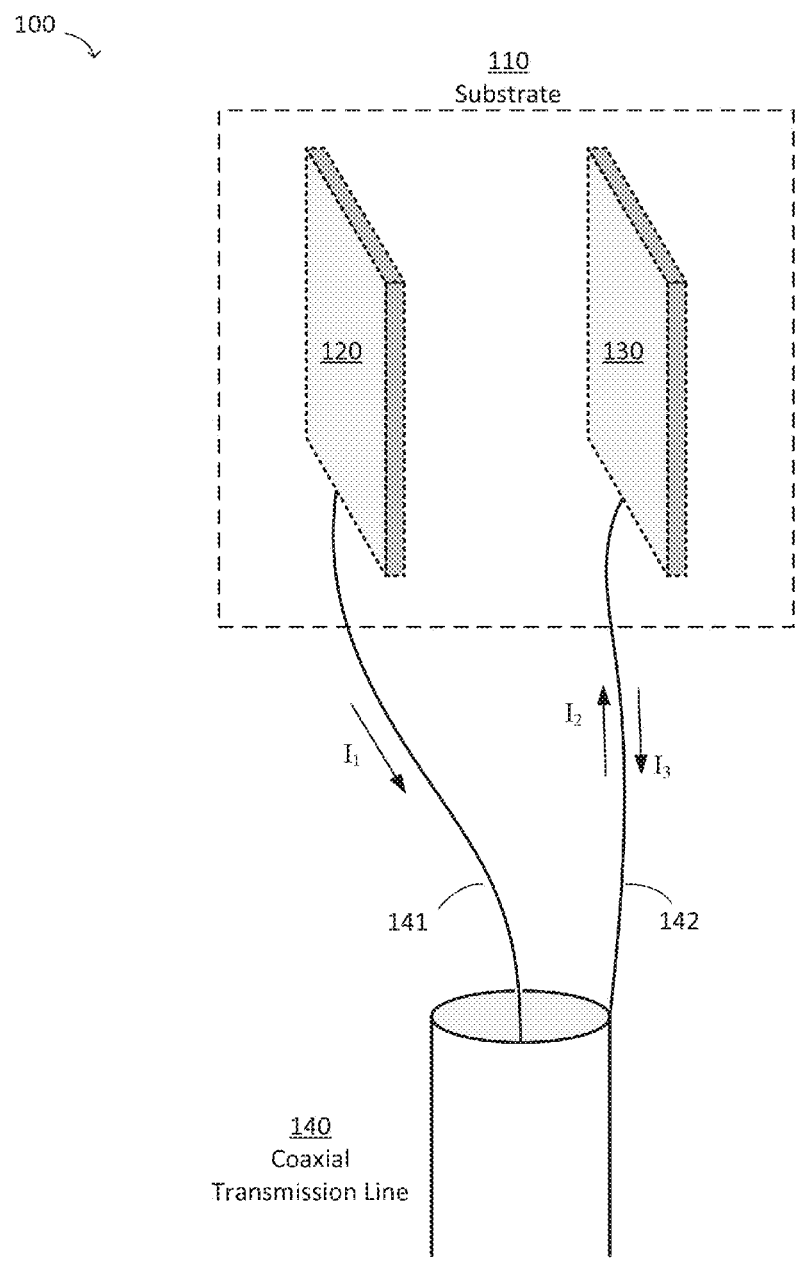
FIG. 1 depicts an illustrative conformal antenna design, according to some embodiments.

In an aerial vehicle, a vertically aligned antenna is commonly used for communications due to the natural support of vertical RF currents provided by vertical conductive structures. However, the vertical height of the antenna can produce a drag effect upon the vehicle during flight, which can cause a reduction in fuel efficiency. In some cases, even a two inch vertical antenna positioned on an aircraft can cause a measurable negative effect upon fuel efficiency. Moreover, the vertically aligned antenna on an aerial vehicle can experience shadowing due to other parts of the vehicle (e.g., fuselage, wing, etc.) being located within the transmitting/receiving path of the antenna. Antennas in aerial vehicles are typically limited as to possible placement locations (e.g., wing, top or bottom of fuselage), and antennas in such locations will generally experience a reduced signal strength in at least some transmitting/receiving directions due to the shadowing effect.

The inventors have recognized and appreciated that an antenna that conforms to the shape of a vehicle may experience lower drag effects than would be experienced by a vertically aligned antenna attached to the vehicle. Such an antenna (sometimes referred to as a "conformal antenna") may thereby increase the fuel efficiency of the vehicle compared with installation of a conventional vertically aligned antenna. Moreover, a conformal antenna may be placed in a wider range of locations than a vertically aligned antenna, which may mitigate or remove shadowing effects normally experienced by a vertically aligned antenna installed on the same vehicle.

However, conformal antennas may conventionally be produced through complex manufacturing processes, which may cause the antennas to be costly to produce. In addition, conventional manufacturing processes may be limited to producing a conformal antenna with a single curve axis, whereas it may be desirable to be able to produce a conformal antenna having any arbitrary shape (e.g., to match that of a portion of a vehicle's body). Conventional photolithography techniques may be used to form an antenna on a planar surface, but such surfaces cannot typically be reformed to conform to a desired shape after formation without causing cracks or other structural defects in the antenna.

In addition, where conformal antennas may be fabricated using traditional manufacturing processes, the antennas may have a low transmission/reception efficiency due to tradeoffs made within the antenna design to make the shape of the antenna fit the desired shape. For example, a conformal antenna may utilize a co-axially fed RF feed line that produces common mode noise and/or exhibits gain drops at particular frequencies.

The inventors have recognized and appreciated that a conformal antenna may be produced using additive manufacturing techniques. This allows production of a structure (e.g., a part of a vehicle) that may have an existing function yet includes the additional function of the antenna. Conductive regions of the conformal antenna may be fabricated directly onto and/or within a structure, and a non-conductive part of the antenna may be part of the structure's internal wall and/or skin.

The inventors have further recognized and appreciated that an infinite balun design may be particularly suitable for a conformal antenna, as it allows substantially balanced currents on both sides of the antenna. These balanced currents may produce a beam with a maximal gain at the horizon which suits applications for aerial vehicles (e.g., when communicating with ground vehicles and/or other air vehicles). The infinite balun design when produced in a conformal antenna may also enable a low cost fabrication through additive manufacturing.

In some cases, an infinite balun may exhibit undesirable feed line coupling. While chokes may be used to mitigate or remove such coupling, traditional chokes (e.g., ferrite chokes) may be bulky or otherwise unsuitable for conformal antenna designs. While a resistive element may be applied in series with the antenna mitigate feed line coupling, such a resistive element may reduce the efficiency of the antenna. The inventors have recognized and appreciated that a choke produced by integrating impedance-producing elements into the infinite balun design may provide sufficient isolation between radiating elements of the antenna and the feed line. This may take the form of a shape chosen for one or both conductive regions of the antenna such that current flow is affected in the manner of a choke.

In view of the above recognitions by the inventors, a novel conformal antenna has been designed based on an infinite balun that includes a choke and that may be produced using additive manufacturing techniques. Accordingly, an efficient and high bandwidth conformal antenna may be produced via relatively low cost manufacturing techniques in any desired shape to conform with an intended installation location.

According to some embodiments, a conformal antenna may include two conducting regions on opposing sides of a substrate. Driving current to and/or from the conducting regions may operate the conducting regions as an antenna. The conducting regions may include feed line sections that couple the conducting regions to a current source.

According to some embodiments, a conformal antenna as described herein may include a coaxial transmission line. Feed lines of the antenna may be coupled to the coaxial transmission line so that one feed line is coupled to an inner conductor of the coaxial transmission line and another feed line is coupled to an outer conductor of the coaxial transmission line. The coaxial transmission line may be a coaxial connector or may include conductors attached to, and/or formed continuously with, conducting regions of the antenna.

Following below are more detailed descriptions of various concepts related to, and embodiments of, a conformal antenna. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 depicts an illustrative conformal antenna design, according to some embodiments. Conformal antenna 100 includes a substrate 110 in which (and/or on which) conductive regions 120 and 130 are disposed. In the example of FIG. 1, conductive region 120 is electrically coupled to the inner conductor of a coaxial transmission line 140, and conductive region 130 is electrically coupled to the outer conductor of the coaxial transmission line.

Conformal antenna 100 may be operated by providing an alternating current to the conductive regions 120 and 130 such that the conductive regions emit electromagnetic waves. The coaxial transmission line 140 may accordingly be coupled to a current source (not shown in the figure) which provides an alternating current signal on the inner and outer conductors of the coaxial transmission line. Current $I_1$ flows from the conductive region 120 to the inner conductor of the coaxial transmission line 140, and current $I_2$ flows from the inner wall of the outer conductor of the coaxial transmission line to the conductive region 130. In some cases, a non-zero current $I_3$ may flow back on the outer wall of the outer conductor.

According to some embodiments, current provided to the inner conductor of the coaxial transmission line by the current source is equal in magnitude and opposite in direction to current provided to the outer conductor of the coaxial transmission line by the current source. In such embodiments, the magnitude of current $I_1$ may be equal to the combined magnitudes of currents $I_2$ and $I_3$. While currents $I_1$, $I_2$ and $I_3$ are depicted in FIG. 1 with arrows, it will be appreciated that the direction of such arrows are provided merely as illustrative directions and that the current directions of each of currents $I_1$, $I_2$ and $I_3$ may in general flow in any direction, and indeed the direction may change direction over time when driven by an alternating current.

As discussed above, to improve efficiency of the antenna design described herein, the inventors have recognized and appreciated that the antenna may be impedance matched by forming the conductive region 120 and/or conductive region 130 to function as a choke. As used herein, a "choke" provides sufficient impedance so as to substantially eliminate power reflected from an antenna. In the example of FIG. 1, this means that the conductive region 120 and/or conductive region 130 are formed so as to minimize the current $I_3$, which represents power reflected from the antenna and is symptomatic of power loss (and thereby loss of antenna efficiency) due to an impedance mismatch.

As discussed above, conventional antenna designs may include a resistive component in series with an antenna which functions as a choke, thereby allowing the impedance to be matched, but this may reduce the efficiency of the antenna due to energy being dissipated by the resistive component. In contrast, the antenna described herein includes conductive regions of the antenna that are shaped so as to function as a choke, thereby providing sufficient impedance to match the impedance of the antenna without components additional to the conductive regions of the antenna.

The conductive regions 120 and 130 may have any suitable shape such that the choke function described above is achieved by one or more features of the conductive region(s). As used herein, a "feature" of a conductive region refers to a portion of the shape of the conductive region. The choke function may be achieved by either or both conductive regions. While conductive regions 120 and 130 are depicted in FIG. 1 as cuboids, they may in general have any shape as the illustrative shapes in FIG. 1 are provided merely as examples. One illustrative pair of conductive regions that include a choke function are discussed below and depicted in FIG. 4.

According to some embodiments, in addition to a feature that functions as a choke, either or both conductive regions may include additional features, such as feed lines. Either or both conductive regions 120 and 130 may include a feed line that, for example, couples the coaxial transmission line to a feature of a conductive region that functions as a choke.

According to some embodiments, conductive regions 120 and 130 may include one or more features that are symmetrically shaped with one another. That is, a feature in one of the conductive regions may be a mirror image of a feature in the other conductive region, or may exhibit some other type of symmetry (e.g., rotational symmetry). In some implementations, the entire conductive regions 120 and 130 may be symmetric with one another. In some implementations, one conductive region may include a first feature and the other conductive region may include a second feature symmetric to the first feature, such as by rotational, mirror and/or other types of symmetry. In some implementations, a feature that functions as a choke within a first conductive region may be present in the other conductive region in the same orientation as in the first conductive region (i.e., the feature is merely translated in space from one region to the other) or may be present in a different orientation (i.e., the feature is rotated and translated in space from one region to the other). The feature in the other conductive region may or may not function as a choke (e.g., due to current flow in the other conductive region being different than in the first conductive region during operation of the antenna).

According to some embodiments, the impedance of conductive regions 120 and 130 may be different from one another. In some implementations, a feature that functions as a choke present in one of the conductive regions is not present in the other conductive region, leading to the different impedance. In other implementations, a feature that functions as a choke present in one of the conductive regions is present in the other conductive region (and may, or may not, be rotated into a different orientation), but due to differences in the feature's orientation in the other conductive region and/or the shape of the remainder of the other conductive region that affect current flow, does not function as a choke in the other conductive region.

According to some embodiments, the size and/or shape of either or both conductive regions 120 and 130 may be selected based on desired transmission/reception wavelengths of the antenna (which may include individual wavelengths in addition to a desired transmission/reception bandwidth). For instance, dimensions of a conductive region and/or dimensions of one or more features of a conductive region may be selected based on desired transmission/reception wavelengths. In some cases, a feature that functions as a choke may have dimensions (e.g., width and/or length) selected based on desired transmission/reception wavelengths.

According to some embodiments, conductive regions 120 and 130 may be located on the surface of substrate 110 and/or may be located within the body of the substrate. The substrate may have any shape such that at least a portion of conductive region 120 and at least a portion of conductive region 130 is in contact with the substrate.

According to some embodiments, surfaces of the conductive regions 120 and 130 facing one another may be a constant distance apart. Accordingly, in some implementations surfaces of the conductive regions that face one another (i.e., the surface of conductive region 120 closest to conductive region 130, and vice versa) may have the same shape, and the distance from one conductive region to another is constant across the surface of the conductive region. The region between the two conductive regions may comprise substrate 110.

According to some embodiments, one or more of the conductive regions 120 and 130 and the substrate 110 may be non-planar. As discussed above, techniques of fabricating a conformal antenna using additive fabrication described herein may allow production of a conformal antenna in any desired shape. As such, any components of the conformal antenna 100 may be fabricated in any suitable shape, and need not be limited to those shapes depicted in illustrative FIG. 1.

According to some embodiments, substrate 110 may be part or all of a functional component of a vehicle, such as a fuselage, wing or tailfin of an aerial vehicle. Accordingly, a component of a vehicle may be fabricated to include substrate 110, conductive regions 120 and 130 and coaxial transmission line 140 such that the typical component used for the vehicle may be replaced in whole or in part with the conformal antenna 100. For instance, a tailfin may be produced via additive manufacturing where substrate 110 represents the majority or all of the structure of the tailfin and conductive regions 120 and 130 and coaxial transmission line 140 are fabricated on and/or within the substrate. The tailfin having a built in antenna may then be installed in a suitable aerial vehicle.

According to some embodiments, substrate 110 comprises a dielectric material that may include, but is not limited to: Polytetrafluoroethylene (PTFE), a foam dielectric (e.g., polyethylene foam), quartz, Acrylonitrile Butadiene Styrene (ABS) or other thermoplastic polymer(s), polyimide, or combinations thereof. In some cases, substrate 110 may comprise a dielectric material selected based on desired transmission/reception wavelengths of the antenna, since the dielectric constant of the material may affect the power at which the antenna transmits and/or receives at those wavelengths.

According to some embodiments, conductive regions 120 and 130 comprise a conductive material that may include any of, but is not limited to: silver, platinum, gold, nickel, copper, aluminum, or combinations thereof. When additively fabricated, the conductive regions 120 and 130 may, in some implementations, be produced by application of a metallic ink. The ink may comprise metallic particles (and possibly additional solid components) within a solvent that evaporates (and/or is removed via sintering) after application of the ink. Such a metallic ink may include metallic particles with a size between 100 and 500 nm.

According to some embodiments, coaxial transmission line 140 may include a coaxial connector so that the conformal antenna 100 may, after fabrication, be connected to a current source via a suitable coaxial cable (e.g., an industry standard coaxial cable). According to some embodiments, coaxial transmission line 140 may include a section of coaxial cable that may, or may not, be additively fabricated with the conductive regions 120 and 130. Regardless of the particular form of the coaxial transmission line, it will be appreciated that additive fabrication techniques applied to fabricate conductive regions 120 and 130 may similarly be used to fabricate any suitable part of a coaxial connector and/or coaxial cable to produce an antenna having desired electrical connections.

Further, it will be appreciated that the electrical connections between the coaxial transmission line 140 and conductive regions 120 and 130 represented in FIG. 1 by lines 141 and 142, respectively, are provided merely to represent said electrical connections, and need not correspond to physical cables, wires or other electrically conductive paths. For example, coaxial transmission line 140 may be physically located in contact with conductive region 120 and/or conductive region 130.

As discussed above, a conformal antenna may include a substrate and two conductive regions to which current may be driven such that the conductive regions operate as an antenna. Moreover, the substrate and conductive regions may be formed via additive fabrication. FIGS. 2A-2D and FIGS. 3A-3C each depict an illustrative process of forming a substrate and conductive regions and depict cross sections of these elements during fabrication. In the example of FIGS. 2A-2D, the substrate is fully formed first, then the conductive regions are formed in contact with the substrate. In the example of FIGS. 3A-3C, the substrate and conductive regions are formed together. In some cases, these two approaches to fabrication may utilize different additive fabrication technologies, as discussed further below.

According to some embodiments, the process illustrated by FIGS. 2A-2D and the process illustrated by FIGS. 3A-3C may each be performed using any additive fabrication techniques. As used herein, "additive fabrication" includes any techniques in which material is additively combined to produce an object, which may include, but is not limited to, stereolithography, selective or fused deposition modeling, direct composite manufacturing, laminated object manufacturing, selective phase area deposition, multi-phase jet solidification, ballistic particle manufacturing, particle deposition, laser sintering, polyjet, aerosol jet, or combinations thereof. In some cases, a portion of the conformal antenna may be fabricated using one or more additive fabrication techniques while another portion may be fabricated using one or more different additive fabrication techniques.

Figure 2A:
FIGS. 2A-2D depict steps of manufacturing a first illustrative conformal antenna, according to some embodiments.

FIGS. 2A-2D depict a sequence of forming a conformal antenna via additive fabrication. The stages of fabrication shown in FIGS. 2A-D are selected merely to illustrate example intermediate stages in the fabrication process. In FIG. 2A, a portion 210 of the substrate of a conformal antenna has been formed via additive fabrication. Components of an additive fabrication device or devices are not shown in the figure for clarity, though it will be appreciated that the portion 210 may be in contact with components of such a device or devices in order that the portion is fabricated. For instance, the portion may be fabricated while resting or otherwise in contact with a build platform.

According to some embodiments, portion 210 may be formed from a dielectric material that may include any of, but is not limited to: Polytetrafluoroethylene (PTFE), a foam dielectric (e.g., polyethylene foam), Acrylonitrile Butadiene Styrene (ABS) or other thermoplastic polymer(s), polyimide, or combinations thereof.

Figure 2B:
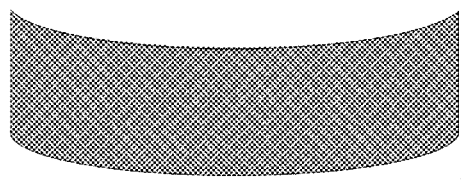
Figure 3A:
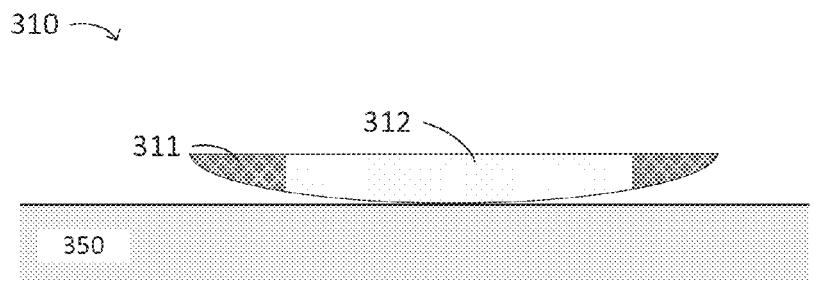
FIGS. 3A-3C depict steps of manufacturing a second illustrative conformal antenna, according to some embodiments.
Figure 3B:
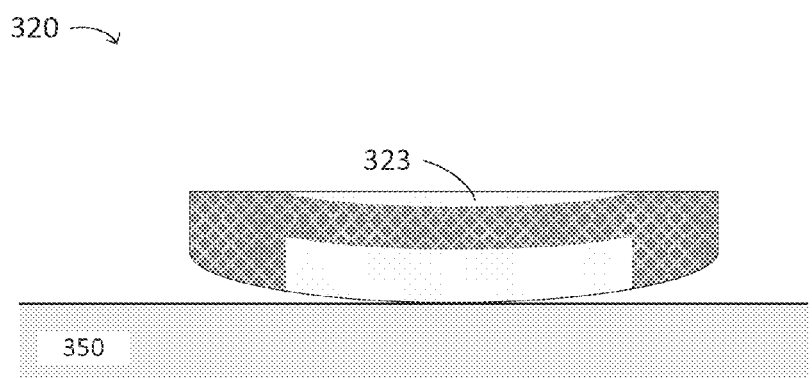
Figure 3C:
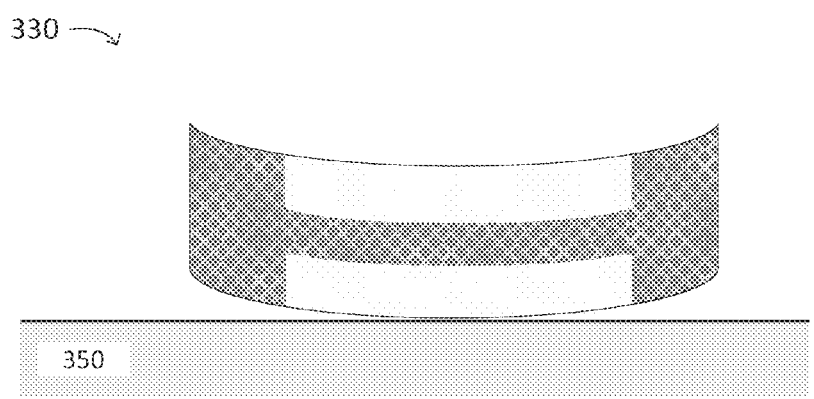

In FIG. 2B, the remainder of the substrate of the conformal antenna has been formed via additive fabrication, thereby producing substrate 220. According to some embodiments, a protective layer may be applied to part or all of the surface of the substrate 220. In some implementations, the protective layer may protect the substrate from deformation or damage due to heat applied during subsequent steps of the fabrication process, such as the sintering process discussed below. According to some embodiments, a protective layer may comprise quartz.

Figure 2C:
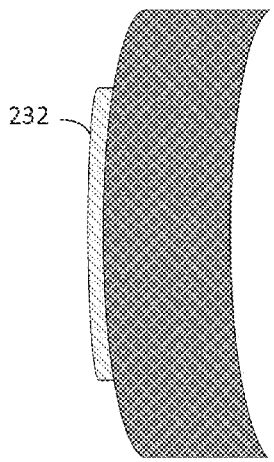
Figure 2D:
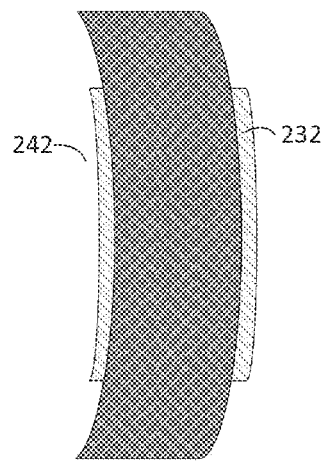

In the example of FIGS. 2A-2D, the substrate of the conformal antenna is formed in a first orientation, then the substrate is moved into new positions for the application of the conductive regions shown in FIGS. 2C and 2D. In FIG. 2C, a conductive region 232 is formed in contact with the substrate. In FIG. 2D, the antenna being formed is rotated and a conductive region 242 is formed opposing the conductive region 232.

According to some embodiments, conductive regions 232 and 242 may be formed through application of a conductive ink by an additive fabrication device such as an aerosol jet device. The conductive ink may be applied in any number of layers, and a period of time may elapse between forming of each layer to allow time for the layer to dry or partially dry before a subsequent layer is formed. In some cases, a conductive ink may be sintered after the ink has been applied through additive fabrication, such as by exposing the ink to temperatures between 150° C. and 200° C. As mentioned above, in some embodiments a protective layer (e.g., quartz) may be applied to the substrate to protect the substrate from heat applied during sintering. Additionally, or alternatively, the substrate may be chosen to have a suitably high glass transition temperature (e.g., between 150° C. and 300° C.) to reduce (or further reduce) the effects of the heat applied during sintering. As discussed above, one or both of the conductive regions of the conformal antenna may have a shape such that it functions as a choke when the conductive regions are operated as an antenna.

FIGS. 3A-3C depict a sequence of forming a conformal antenna via additive fabrication by forming the substrate and conductive regions together rather than fully forming the substrate and then forming the conductive regions as shown in FIGS. 2A-2D. Accordingly, the process shown in FIGS. 3A-3C may be performed by one or more additive fabrication devices equipped to form multiple materials, such as an ink jet additive fabrication device equipped with multiple nozzles.

In FIG. 3A, a portion of a conformal antenna has been fabricated via additive fabrication on build platform 350. The portion includes substrate portion 311 and a portion of a first conductive region 312. The substrate portion 311 may be formed from any suitable material, including but not limited to: Polytetrafluoroethylene (PTFE), a foam dielectric (e.g., polyethylene foam), Acrylonitrile Butadiene Styrene (ABS) or other thermoplastic polymer(s), polyimide, or combinations thereof. Portion of the first conductive region 312 may be formed from any suitable conductive material, which may include materials suitable for additive fabrication that include a thermoplastic component in addition to a metallic component, such as silver, gold, copper, etc.

In FIG. 3B, additional substrate material has been formed, the first conductive region has been completed and a second conductive region 323 is beginning to be formed. In FIG. 3C, the conformal antenna is completed. A sintering step as described above in relation to FIGS. 2C and 2D may or may not be performed, depending on the type of material utilized to form the conductive regions of antenna 330. As discussed above, one or both of the conductive regions of the conformal antenna may have a shape such that it functions as a choke when the conductive regions are operated as an antenna.

In the example of FIGS. 3A-3C, the conductive regions are embedded within the substrate portion, whereas in the example of FIGS. 2A-2D the conductive regions are formed onto the substrate portion. Neither approach has a direct bearing on the two approaches of forming the components in sequence or together (as shown in FIGS. 2A-2D and FIGS. 3A-3C, respectively), and are merely illustrated as exemplary ways to arrange the substrate and conductive regions in a conformal antenna.

According to some embodiments, layers produced via additive fabrication in both the examples of FIGS. 2A-2D and FIGS. 3A-3C may have a thickness between 1 μm and 300 μm. Layers may be deposited in sequence from one end of the object to another, or may be deposited out of sequence. For instance, layers may be formed in sequence starting from a layer in contact with a build platform and proceeding such that each subsequent layer is formed a greater distance from the build platform than the preceding layer. Alternatively, material may be formed in a different sequence, which may include use of an additive fabrication device having more than three axes of motion (e.g., 4-axis, 5-axis, etc.). Such a device may have more freedom to deposit material out of a layer sequence than a 3-axis device that is constrained to deposit in sequential layers as described above.

It will be appreciated that in both the examples of FIGS. 2A-2D and FIGS. 3A-3C, support material not shown in the figures may be additively fabricated where necessary or desirable to mechanically support the conformal antenna during fabrication. Such supports may be removed subsequent to the fabrication process. Furthermore, the illustrative conformal antenna shapes shown in the examples of FIGS. 2A-2D and FIGS. 3A-3C are provided merely as examples, and in general a conformal antenna of any suitable shape having substrate and conductive regions of any shapes may be formed by additive fabrication, as discussed above.

According to some embodiments, additive fabrication in both the examples of FIGS. 2A-2D and FIGS. 3A-3C may include steps in addition to steps of depositing material. For instance, certain additive fabrication technologies may utilize expose of UV radiation to turn a liquid photopolymer into a solid polymer after the liquid photopolymer is deposited, and it is assumed in the above examples that whichever additional such steps may be included to perform additive fabrication are included in these processes.

FIG. 4 depicts an illustrative conformal antenna, according to some embodiments. Conformal antenna 400 has a first side 401 and a second side 402, and comprises a substrate 410, conductive regions 420 and 430 and a coaxial transmission line 440. While substrate 410 is shown as separate regions on first side 401 and second side 402 of the conformal antenna, it will be appreciated that the depicted antenna has a single substrate and that both sides of the substrate are being depicted in the two views shown in FIG. 4.

In the example of FIG. 4, conformal antenna 400 includes a coaxial connector 440, of which inner conductor 441 is coupled to the conductive region 420 and outer conductor 442 is coupled to the conductive region 430. Conductive region 420 includes a "slot line" feature 421 and conductive region 430 includes feature 431, which is the same size and shape as feature 421 though in a different orientation. In addition, conductive region 420 includes a feed line 422 and conductive region 430 includes a feed line 432.

The feature 431 functions as a choke when the conductive regions 420 and 430 are operated as an antenna. Current flowing along the inner wall of the outer conductor 442 in the +z direction will be impeded from flowing back on the outer wall of the conductive region 430 due to the slot lines 431, thereby producing a choke. In contrast, the slot lines 421 produce a different impedance with respect to current flowing in conductive region 420. In effect, the depicted conductive region 430 may create a standing wave thereby producing efficient operation of the antenna through impedance matching.

As shown in the example of FIG. 4, the shapes of the triangular section of each conductive region (being the part of each conductive region not including the respective feed line) are the same. This may ensure symmetric operation of the antenna by dissipating equal power on both sides of the antenna. According to some embodiments, the triangular section of a conductive region has a length (its extent in the z-direction) equal to twice that of its width (its extent in the x-direction).

It will be appreciated that, as discussed above, a conformal antenna may be produced in any suitable shape, and accordingly the planar shape of the antenna shown in the example of FIG. 4 is merely one example. For instance, the conductive regions 420 and 430 could be projected onto a curved surface so that the same function as discussed above may be produced on a conformal antenna in any given shape and size.

In addition, the "slot line" features depicted in the example of FIG. 4 are just one example of choking the current by selecting an appropriate shape of the conductive region 430. Other similar feature shapes could be applied, such as slot lines that have a curved shape. For instance, conductive regions may include "tear drop" shapes and/or circular shapes.

According to some embodiments, the substrate 410 has a thickness (i.e., the distance between the surface of the substrate on the first side 401 and the surface of the substrate on the second side 402) between 50 μm and 10 mm, such as between 0.5 mm and 5 mm. The substrate thickness may preferably be substantially constant, at least through the regions that are between the conductive regions. In some implementations, the substrate thickness may be determined, at least in part, by the impedance of feed lines 422 and/or 432, the substrate's maximum power handling capacity, and/or by selecting the thickness of the substrate to be sufficiently large so as to avoid surface wave modes at the highest operating frequency of the antenna.

Figure 5:
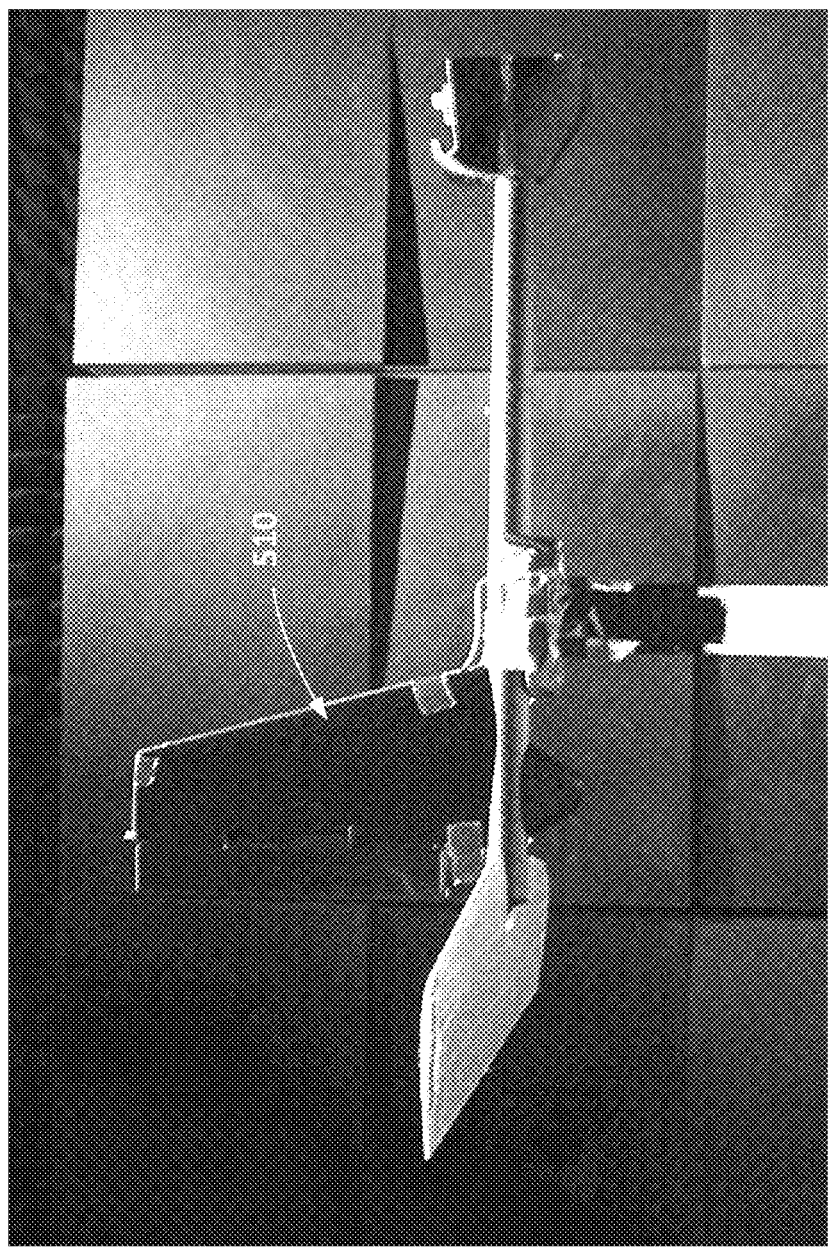
FIG. 5 depicts an aerial vehicle in which a conformal antenna is installed, according to some embodiments.

FIG. 5 depicts an aerial vehicle in which a conformal antenna is installed, according to some embodiments. Aerial vehicle 500 includes a tailfin 510 that includes a conformal antenna fabricated via techniques described herein within the body of the tailfin. The conformal antenna may be installed within the tailfin, for example, and a covered with a para-aramid synthetic fiber (e.g., Kevlar®) epoxy skin.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

For instance, while an antenna design including a conductive region that functions as a choke has been described in particular as being produced via additive fabrication, such an antenna need not be produced in this manner. While there are advantages to producing an antenna via additive fabrication—as discussed above, these advantages include the ability to produce a conformal antenna in any desired shape and size—it is within the scope of this disclosure to produce an antenna having this design without using additive fabrication techniques. In some cases, additive fabrication could be used to fabricate a portion of the antenna and non-additive fabrication techniques could be used to fabricate the remainder of the antenna. For example, a substrate may be formed using non-additive fabrication techniques, and conductive features may then be formed in contact with the substrate using additive fabrication techniques.

While aerial vehicles in particular are described herein, use of the antenna design and additive fabrication techniques described herein are not limited to production of antennas for use with aerial vehicles. A conformal antenna as described herein may be installed in any type of vehicle or at any stationary (non-vehicle) location as the invention is not limited in this manner.

While particular additive fabrication technologies have been discussed herein, the invention is not limited to any particular additive fabrication technology, technique nor device, though particular techniques may have advantageous properties, as discussed above.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Various inventive concepts may be embodied as one or more methods, of which examples have been provided. The acts performed as part of any method described herein may be ordered in any suitable way. Accordingly, embodiments may be constructed in which acts are performed in an order different than illustrated, which may include performing some acts simultaneously, even though these acts may have been shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein, unless clearly indicated to the contrary, should be understood to mean "at least one." As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

What is claimed is:

1. An antenna, comprising:
a substrate;
a first conductive region disposed on a first side of the substrate;
a second conductive region disposed on a second side of the substrate; and
a coaxial transmission line, an inner conductor of the coaxial transmission line electrically coupled to the first conductive region and an outer conductor of the coaxial transmission line electrically coupled to the second conductive region,
wherein the first conductive region includes one or more first slots,
wherein the second conductive region includes at least one structural feature that functions as a choke when the first and second conductive regions are operated together as an antenna,
wherein the at least one structural feature comprises one or more second slots that inhibit current flow on an exterior of the outer conductor of the coaxial transmission line, and
wherein the second conductive region comprises a tapered section that narrows toward a first end of the second conductive region.

2. The antenna of claim 1, wherein the second side of the substrate opposes the first side of the substrate.

3. The antenna of claim 1, wherein the outer conductor of the coaxial transmission line electrically couples to the second conductive region at a second end of the second conductive region, and wherein the second end of the second conductive region opposes the first end of the second conductive region.

4. The antenna of claim 1, wherein the tapered section has a triangular shape.

5. The antenna of claim 1, wherein the inner conductor of the coaxial transmission line electrically couples to the first conductive region at a first end of the first conductive region, and wherein the first conductive region comprises a tapered section that narrows toward the first end of the first conductive region.

6. The antenna of claim 1,
   wherein the first conductive region includes a first feed line that electrically couples the first conductive region to the to the inner conductor of the coaxial transmission line, and
   wherein the second conductive region includes a second feed line that electrically couples the second conductive region to the to the outer conductor of the coaxial transmission line.

7. The antenna of claim 1, wherein at least a portion of the first conductive region is rotationally symmetric to a portion of the second conductive region.

8. The antenna of claim 1, wherein the choke is an RF choke.

9. The antenna of claim 1, wherein the substrate is non-planar.

10. The antenna of claim 1, wherein the coaxial transmission line is a coaxial connector.

11. The antenna of claim 1, wherein the antenna produces a vertically polarized signal.

12. The antenna of claim 1, wherein at least the first conductive region and second conductive regions each comprise a plurality of layers formed through additive fabrication.

13. The antenna of claim 1, wherein the first and second conductive regions comprise silver.

14. The antenna of claim 1, wherein the substrate comprises Acrylonitrile Butadiene Styrene (ABS).

15. A method of fabricating a conformal antenna, comprising:
   forming a substrate from a dielectric material via additive fabrication;
   forming, from a conductive material via additive fabrication, a first conductive region on a first side of the substrate, wherein the first conductive region includes one or more first slots; and
   forming, from the conductive material via additive fabrication, a second conductive region on a second side of the substrate,
   wherein the second conductive region includes at least one feature that functions as a choke when the first and second conductive regions are operated together as an antenna,
   wherein the at least one feature comprises one or more second slots that inhibit current flow on an exterior of the outer conductor of the coaxial transmission line, and
   wherein the second conductive region comprises a tapered section that narrows toward a first end of the second conductive region.

16. The method of claim 15,
   wherein the outer conductor of the coaxial transmission line electrically couples to the second conductive region at a second end of the second conductive region, and wherein the second end of the second conductive region opposes the first end of the second conductive region.

17. The method of claim 15, further comprising forming at least a portion of a coaxial transmission line such that an inner conductor of the coaxial transmission line is electrically coupled to the first conductive region and an outer conductor of the coaxial transmission line is electrically coupled to the second conductive region.

18. The method of claim 17,
   wherein the first conductive region includes a first feed line that electrically couples the first conductive region to the to the inner conductor of the coaxial transmission line, and
   wherein the second conductive region includes a second feed line that electrically couples the second conductive region to the to the outer conductor of the coaxial transmission line.

19. The method of claim 15, wherein the substrate is non-planar.

20. The method of claim 15, wherein the dielectric material is a low-k dielectric.

21. The method of claim 15, wherein forming the first conductive region comprises:
   applying a metallic material to the substrate; and
   sintering the metallic material.

22. The method of claim 15, wherein forming the first and second conductive regions via additive fabrication utilizes an additive fabrication device having more than three axes of motion.

23. The method of claim 15, wherein forming the first and second conductive regions via additive fabrication utilizes an aerosol jet additive fabrication device.

24. The method of claim 15, wherein the first and second conductive regions comprise silver.

25. An aerial vehicle comprising:
   at least one conformal antenna that comprises:
      a substrate;
      a first conductive region disposed on a first side of the substrate and including one or more first slots;
      a second conductive region disposed on a second side of the substrate; and
      a coaxial transmission line, an inner conductor of the coaxial transmission line electrically coupled to the first conductive region and an outer conductor of the coaxial transmission line electrically coupled to the second conductive region,
      wherein the second conductive region includes at least one structural feature that functions as a choke when the first and second conductive regions are operated together as an antenna,
      wherein the at least one structural feature comprises one or more second slots that inhibit current flow on an exterior of the outer conductor of the coaxial transmission line, and
      wherein the second conductive region comprises a tapered section that narrows toward a first end of the second conductive region.

26. The aerial vehicle of claim 25, wherein the substrate is at least a portion of a functional component of the aerial vehicle's structure.

27. The aerial vehicle of claim 26, wherein the functional component is a wing or a tailfin.

28. An antenna, comprising:
   a substrate;
   a first conductive region disposed on a first side of the substrate;
   a second conductive region disposed on a second side of the substrate; and
   a coaxial transmission line, an inner conductor of the coaxial transmission line electrically coupled to the first conductive region and an outer conductor of the coaxial transmission line electrically coupled to the second conductive region, wherein the second conductive region includes at least one structural feature that functions as a choke when the first and second conductive regions are operated together as an antenna, wherein the at least one structural feature comprises one or more slots that inhibit current flow on an exterior of the outer conductor of the coaxial transmission line, at least a first slot of the one or more slots including a first portion oriented in a first direction and a second portion oriented in a second direction perpendicular to the first direction, and wherein the second conductive region comprises a tapered section that narrows toward a first end of the second conductive region.

* * * * *